United States Patent
Iseki et al.

(12) 
(10) Patent No.: US 6,348,982 B2
(45) Date of Patent: Feb. 19, 2002

(54) IMAGE PROCESSING APPARATUS AND METHOD OF CONTROLLING THE SAME

(75) Inventors: Yukimasa Iseki, Abiko; Takashi Sugiura, Moriya-machi; Yasuyuki Aikoh, Toride; Tetsuya Morita, Yokohama; Takeharu Uchizono, Abiko; Hideaki Chishima, Hino; Satoru Kanno, Kashiwa; Masayoshi Taira, Kashiwa; Shunji Yamashida, Kashiwa, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/296,462

(22) Filed: Apr. 22, 1999

(30) Foreign Application Priority Data

Apr. 23, 1998 (JP) .......................... 10-113257
Feb. 23, 1999 (JP) .......................... 11-044653

(51) Int. Cl.$^7$ ................................ H04N 1/04
(52) U.S. Cl. ...................... 358/475; 358/474
(58) Field of Search ................ 358/475, 497, 358/496, 494, 474, 401, 405, 408, 419, 420, 421, 422, 423, 448, 472, 473, 480, 481

(56) References Cited

U.S. PATENT DOCUMENTS

| | | | | |
|---|---|---|---|---|
| 4,310,757 A | * | 1/1982 | Check | .................. 250/236 |
| 4,885,640 A | * | 12/1989 | Yoshiura | .................. 358/400 |
| 5,072,304 A | * | 12/1991 | Abe | .................. 358/296 |
| 5,357,351 A | * | 10/1994 | Nakajima | .................. 358/482 |
| 5,402,252 A | * | 3/1995 | Kojima | .................. 358/486 |
| 5,750,974 A | * | 5/1998 | Sasaki | .................. 235/454 |

FOREIGN PATENT DOCUMENTS

JP      11088601 A    *   3/1999

* cited by examiner

*Primary Examiner*—Jerome Grant, II
*Assistant Examiner*—Negussie Worku
(74) *Attorney, Agent, or Firm*—Fitzpatrick, Cella, Harper & Scinto

(57) ABSTRACT

An image processing apparatus is provided which comprises an image reading section for reading an original document by causing an image reading head of the image reading section to move relative to an original document; an image recording section for recording an image on a recording medium in accordance with an image signal; a power source for supplying power to the image reading section and the image recording section; and a control device for controlling the speed of movement of the image reading head according to an operating state of the image recording section. The image processing apparatus of the invention overcomes problems associated with the use of prior art image forming apparatus, such as multi-function copying machines, that include an image reading section and an image recording section, and which require the use of large-capacity power sources for supporting the electrical loads of various components that may be operating simultaneously within the individual apparatuses.

12 Claims, 11 Drawing Sheets

FIG. 3a
ROTATION SIGNAL 121

FIG. 3b
NO. OF REVOLUTIONS OF POLYGON MOTOR

FIG. 3c
STEADY-STATE ROTATION SIGNAL 122

FIG. 4a

ROTATION SIGNAL 131

FIG. 4b

FORWARD/BACKWARD
SIGNAL 132

FIG. 4c

TARGET NUMBER OF
REVOLUTIONS SIGNAL 133

FIG. 4d

CONSTANT-CURRENT-VALUE
SWITCH SIGNAL 134

FIG. 5a

ROTATION SIGNAL 131

FIG. 5b

FORWARD/BACKWARD SIGNAL 132

FIG. 5c

TARGET NUMBER OF REVOLUTIONS SIGNAL 133

FIG. 5d

CONSTANT-CURRENT-VALUE SWITCH SIGNAL 134

IMAGE PROCESSING APPARATUS AND METHOD OF CONTROLLING THE SAME

BACKGROUND OF THE INVENTION

1. Field of the Invention

The present invention relates to an image processing apparatus, such as a copying machine.

2. Description of the Related Art

Hitherto, multi-function copying machines have been commercially available. Multi-function copying machines typically comprise an image reading section, an image forming section, a facsimile communication section, and a PDL (page description language) receiving section, thereby realizing, for example, a copying function, a facsimile function, a printer function, a scanner function, and the like in one machine. In such copying machines, these functions can be performed simultaneously. For example, while the image forming section is being used for a printer function, the image reading section can be used to perform facsimile transmission.

However, such apparatuses typically include various electrical loads, such as a polygon motor for rotating a polygon mirror which scans laser light, a main motor for rotating a rotary drum, a heat roller of a fixing means, and the like, and thus require a large current at the start-up thereof. In particular, in multi-function copying machines, since a section inside the apparatus may be operating while one or more of these loads are being started, a large-capacity power source is required.

SUMMARY OF THE INVENTION

Accordingly, it is an object of the present invention, the achievement of which solves the above-described problems, to provide an image processing apparatus and a method of controlling the same.

According to one aspect of the present invention, this objective is achieved by providing an image processing apparatus, comprising: an image reading section for reading an original document by causing an image reading head of the image reading section to move relative to the original document; an image recording section for recording an image on a recording medium in accordance with an image signal; and a power source for supplying power to the image reading section and the image recording section, wherein there is further provided a control means for controlling the speed of movement of the image reading head within the image reading section according to an operating state of the image recording section.

According to another aspect of the present invention, the object of the invention is achieved by providing a method for controlling an image processing apparatus, comprising steps of: reading, with an image reading section, an original document by causing an image reading head of the image reading section to move relative to the original document; recording, with an image recording section, an image on a recording medium in accordance with an image signal; and supplying power from a power source to the image reading section and the image recording section, the method further comprising the step of controlling the speed of the image reading head within the image reading section according to an operating state of the image recording section.

The above-described and further objects, aspects and novel features of the invention will become more apparent from the following detailed description when read in connection with the accompanying drawings.

DETAILED DESCRIPTION OF THE PREFERRED EMBODIMENTS

A multi-function copying machine according to the present invention will now be described below with reference to the accompanying drawings.

First Embodiment

Figure 2:
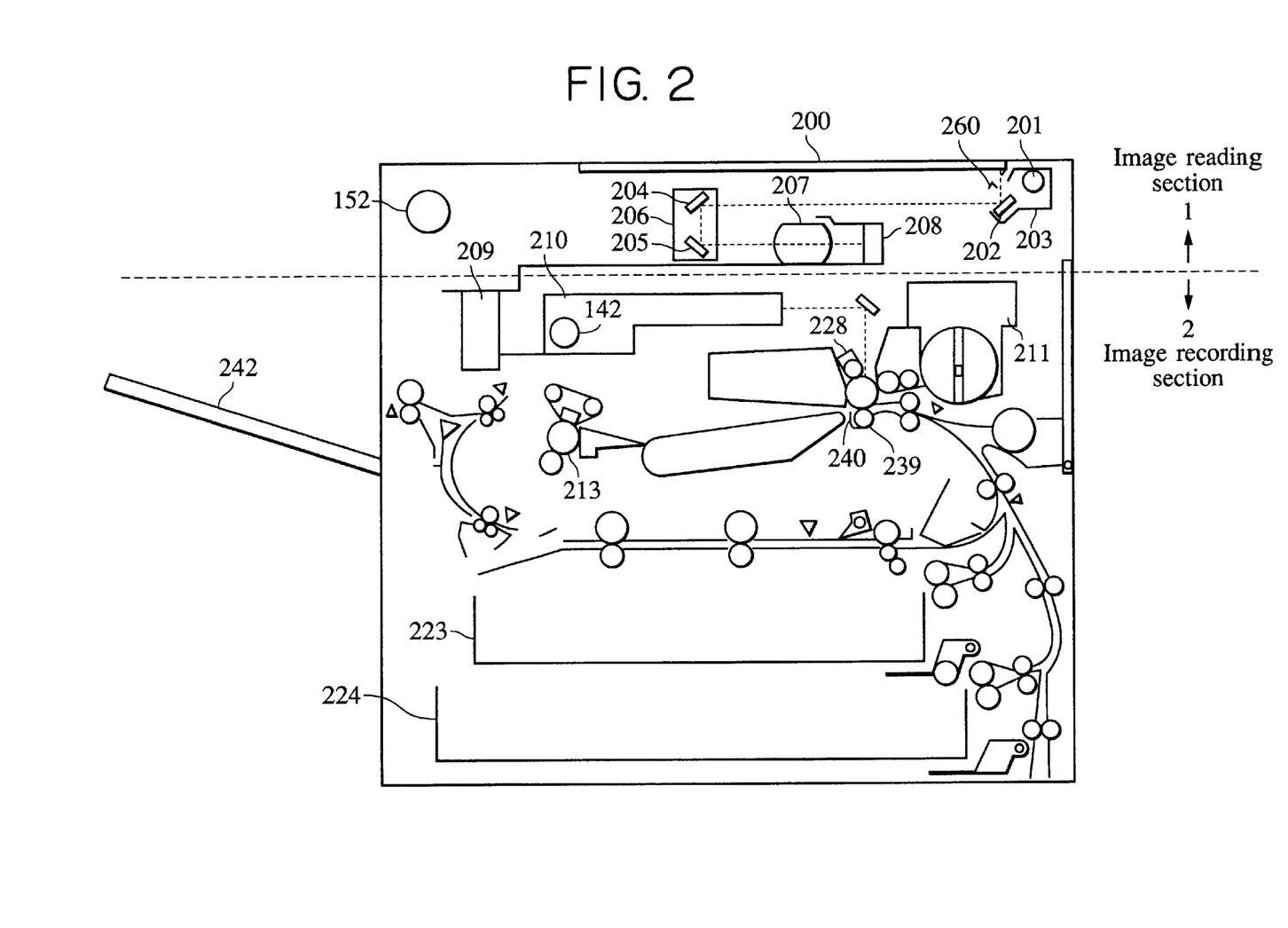
FIG. 2 is an illustration of an image forming apparatus according to the first embodiment of the present invention.

FIG. 2 shows a multi-function copying machine according to a first embodiment of the present invention.

The multi-function copying machine of this embodiment generally comprises an image reading section 1 for reading an original document image and converting it into image signals, and an image recording section 2 for recording an image on transfer paper on the basis of the image signals.

The construction of the image reading section 1 is described first. Referring to FIG. 2, an exposure lamp 201, formed from a fluorescent lamp, a halogen lamp, or the like, irradiates an original document on a document placement glass (document holder) 200 while moving in a direction perpendicular to its length direction. The reflected light from the original document as a result of the radiation by the exposure lamp 201 is reflected by first, second, and third mirrors 202, 204, and 205, respectively, and enters a lens 207. Here, with respect to the movement of a first movable member 203 composed of the exposure lamp 201 and the first mirror 202, a second movable member 206 composed of the second mirror 204 and the third mirror 205 moves at half speed, causing the distance from the radiated surface of the original document to the lens 207 to be maintained constant. The first movable member 203 and the second movable member 206 constitute an image reading head, that is, a scanner head, which will be described below, and these components are driven by a scanner motor 152, which will also be described below.

With this construction, while the reflected light from the original document is formed into an image on the light-receiving section of a CCD line sensor 208, in which an array of several thousand photoreceptor elements are arranged in lines via the mirrors 202, 204, and 205, and the lens 207, and is photo-electrically converted sequentially in units of lines by the CCD line sensor 208, the scanner head moves in a direction to the right in the figure. This makes it possible to scan the entire surface of the original document. When the scanning of the entire surface of the original document is completed, the scanner head moves in a direction to the left in the figure and stops where it returns to its original position. The foregoing is a description of the image recording section.

An electrical signal (in the form of photo-electrically converted image information) obtained in this manner is then processed by a signal processing section (not shown), after which it is pulse-width-modulated, causing a laser to be driven.

Next, the construction of the image recording section 2 is described.

An exposure control section 210 drives a semiconductor laser in accordance with a PWM-modulated image signal, which is output from the signal processing section, in order to radiate a light beam onto the surface of a photosensitive member 240. A polygon mirror 143 is used to deflect and scan a light beam in a direction parallel to the axial direction of the drum-shaped photosensitive member 240, and the photosensitive member 240 is rotated at a constant speed, making it possible for the light beam to scan on the photosensitive member 240 in a two-dimensional manner. This polygon mirror 143 is drivingly rotated by a polygon motor 142, which will be described below. The exposure control section 210 is cooled by a cooling fan 209.

Meanwhile, in the photosensitive member 240, before the light beam is received, electrical charge remaining on the photosensitive member 240 is removed by a pre-exposure lamp (not shown), and the surface thereof is uniformly charged by a primary charger 228. Then, as a result of receiving a light beam from the semiconductor laser driver by the exposure control section 210, as described above, an electrostatic latent image is formed. Next, the electrostatic latent image on the surface of the drum is made visible using a developing agent (toner) by a developing unit 211. The toner image which is made visible is then transferred to transfer paper fed from a paper-feed cassette 223 or 224 in a transfer section 239. Then, the transfer paper is passed through a transfer roller 213 (which has a heater contained therein) that is heated to a predetermined target temperature, and, as a result, the toner image on the transfer paper becomes fixed onto the transfer paper. The transfer paper with the fixed toner image is then ejected in a paper-ejection section 242. The photosensitive member 240 is rotated by a main motor (not shown).

Although not shown, there is a case in which an automatic document feeder (ADF) is disposed on the document holder glass 200. This is such that when a plurality of documents sheets are set in a document placement section of the ADF, documents are fed one by one onto the document holder glass 200 in accordance with a signal from a CPU of the main unit of this multi-function copying machine.

Not only are the image signals obtained by the image reading section sent to the image recording section in order to obtain a copy image, but also these image signals can be transmitted by a facsimile via a facsimile communication section (not shown) and a public network, and/or can be sent to a host computer over a network. Furthermore, the image recording section not only records an image in accordance with an image signal sent from the image reading section, but can also record an image in accordance with an image signal received in a facsimile communication via a public network and a facsimile communication section (not shown), and/or an image signal sent from a host computer via a network and a PDL receiving section (not shown). Therefore, the image reading section and the image recording section are not necessarily started and used at the same time, and one of them may be started and used at a necessary timing as required.

Figure 1:
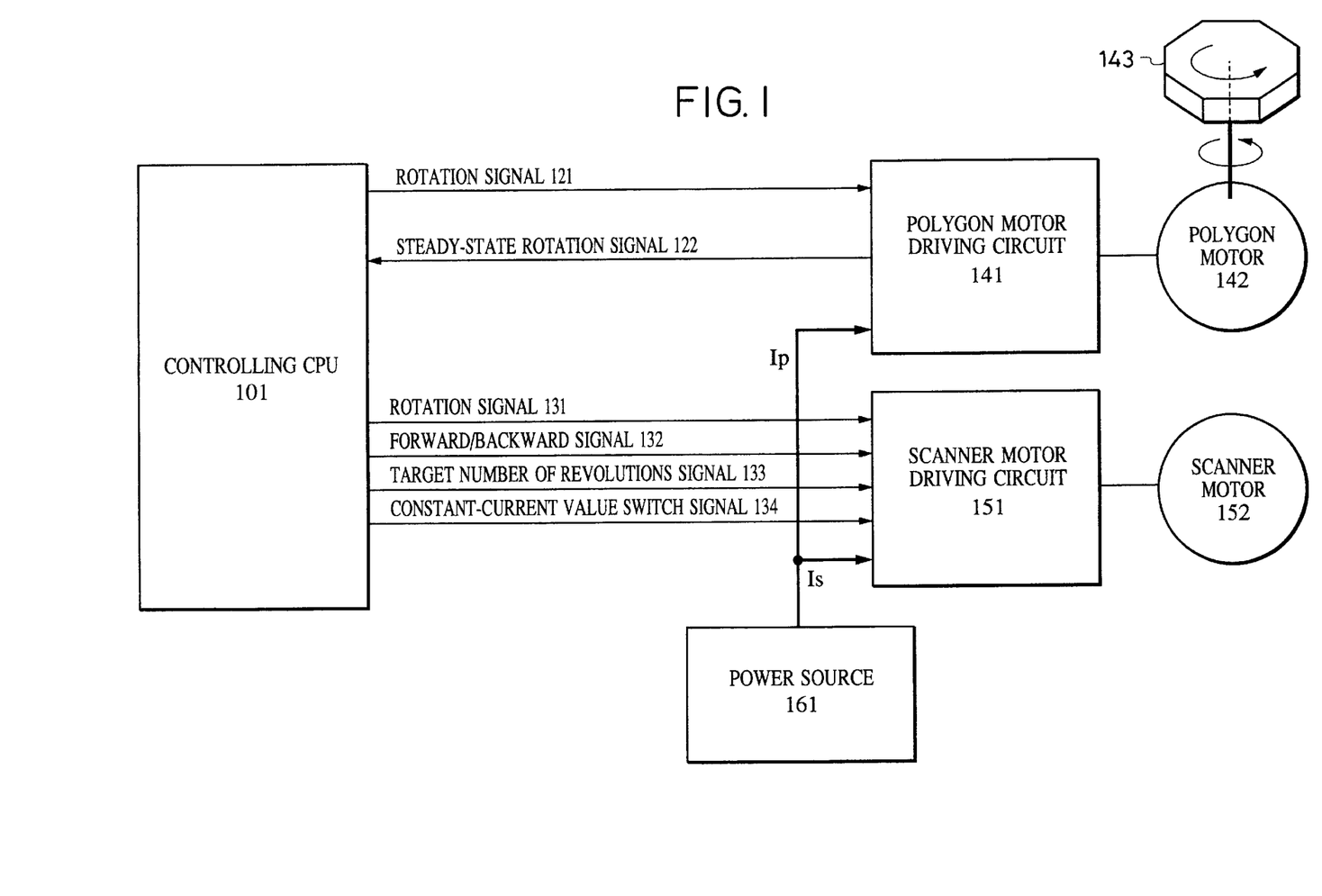
FIG. 1 shows control blocks of a polygon motor and a scanner motor according to a first embodiment of the present invention.

Next, the control of the polygon motor 142 and the scanner motor 152 is described. FIG. 1 shows control blocks representing these motors.

Referring to FIG. 1, reference numeral 142 denotes the above-mentioned polygon motor for rotating the polygon mirror 143. Reference numeral 141 denotes a polygon-motor driving circuit for driving the polygon motor 142. Reference numeral 152 denotes the above-mentioned scanner motor for reciprocating the scanner head. Reference numeral 151 denotes a scanner-motor driving circuit for driving the scanner motor 152. Reference numeral 101 denotes a controlling CPU for outputting various control signals to the polygon-motor driving circuit 141 and the scanner-motor driving circuit 151. Reference numeral 161 denotes a power source for supplying power to the polygon-motor driving circuit 141 and the other sections within the image recording section, and to the scanner-motor driving circuit 151 and the other sections within the image reading section.

Examples of cases in which the image recording section is started up while the image reading section is not operating include facsimile receptions from a public network, and PDL receptions from a host computer. Furthermore, in such cases, examples of cases in which the image reading section is started up include facsimile transmissions to the public network and transmissions of image signals to the host computer.

Figure 3A:
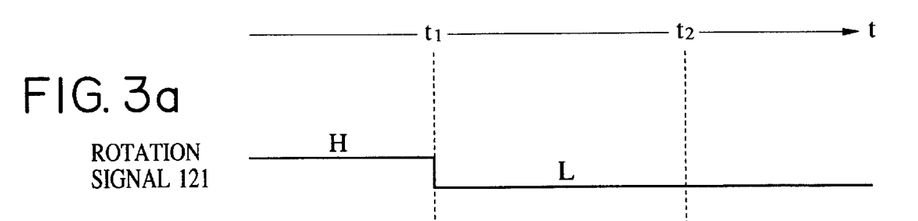
FIGS. 3a–3c show timing chars representing a start-up operation of the polygon motor.
Figure 3B:
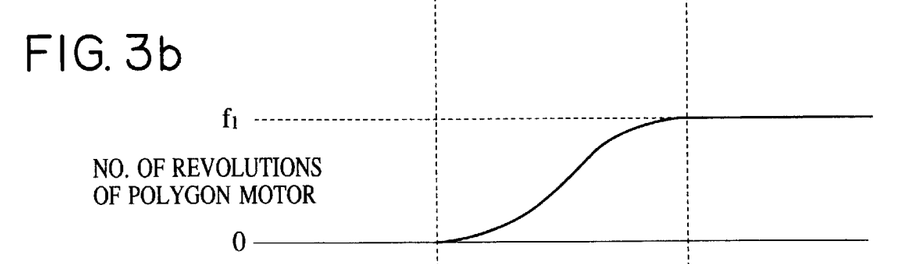
Figure 3C:
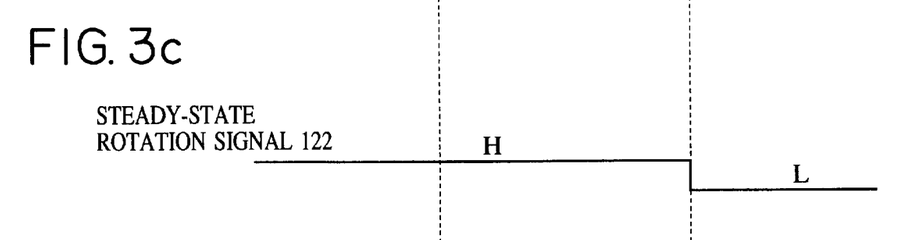
Figure 4A:
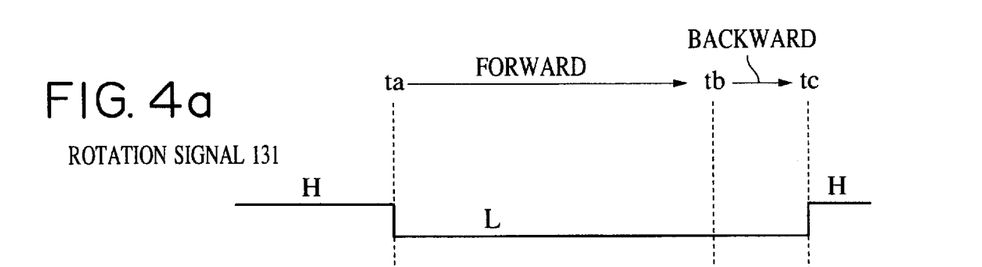
FIGS. 4a–4d show timing charts 1 of scanner motor control, during a time period other than that when the polygon motor is being started.
Figure 4B:
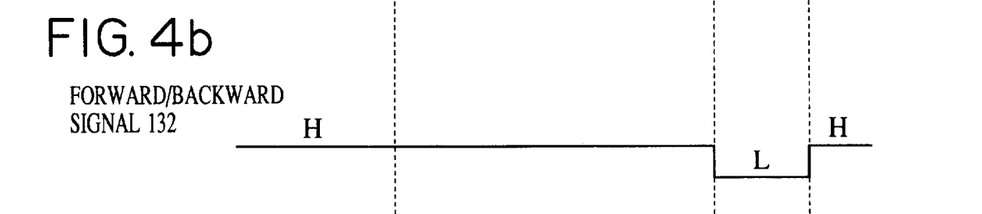
Figure 4C:
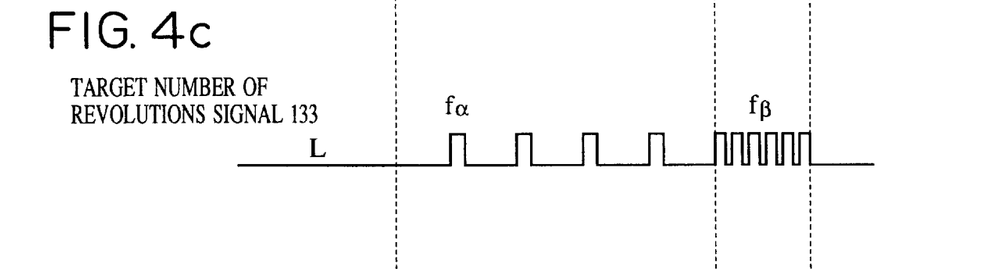
Figure 4D:
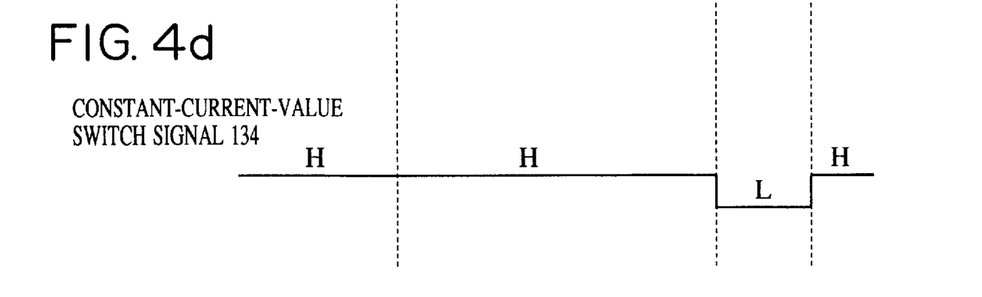
Figure 5A:
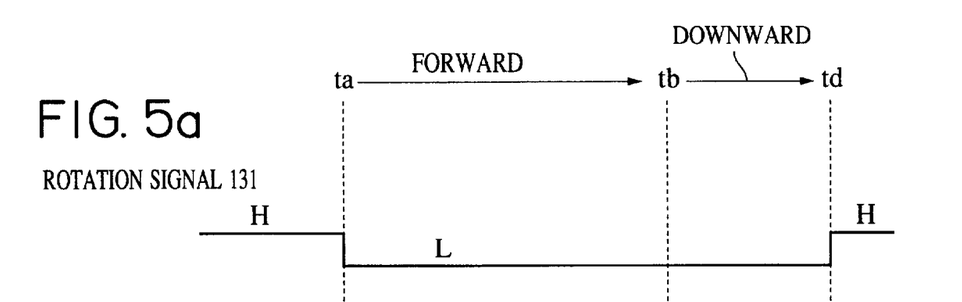
FIGS. 5a–5d show timing charts 2 of scanner motor control during a time period when the polygon motor is being started.
Figure 5B:
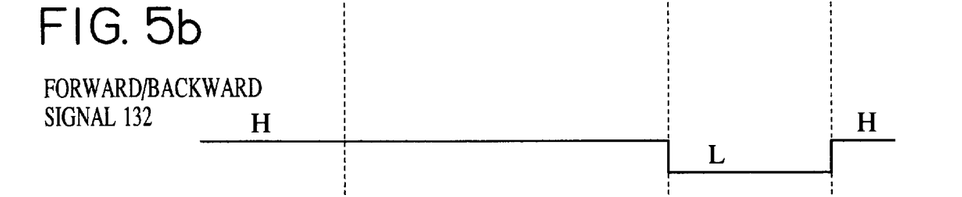
Figure 5C:
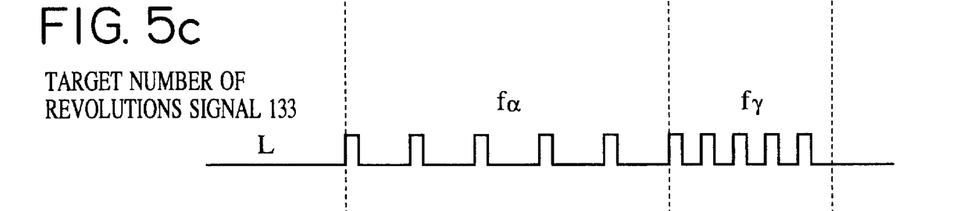
Figure 5D:
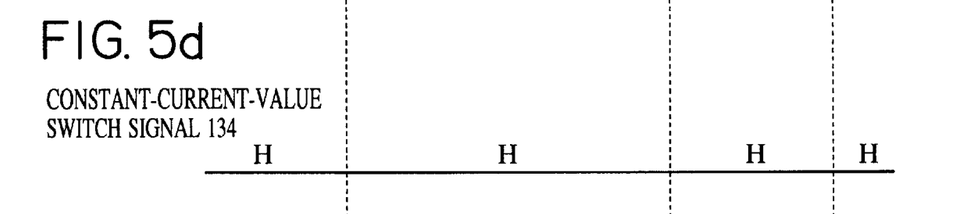

With reference to the timing charts of FIGS. 3a–3c, the operation when the polygon motor 141 is started up is described. First, in an initial state, both a rotation signal 121 and a steady-state rotation signal 122 are at an H level (t<t1). Then, when an instruction of image formation is made from the main control section (not shown), the controlling CPU 101 changes the level of the rotation signal 121 from H to L (t=t1), and the polygon motor 142 begins to rotate gradually. The driving current during the time when this polygon motor 142 is being started is larger than the driving current during the steady-state rotation state.

Subsequently, when the polygon motor 142 reaches a steady-state rotation state (t=t2), the polygon-motor driving circuit 141 reduces the level of the steady-state rotation signal 122 to L, thereby notifying the controlling CPU 101 of the fact that the polygon motor 142 has entered a steady-state rotation state. Therefore, in this embodiment, the control conditions for the scanner head are changed during a period in which the polygon motor 142 is being started.

The control of the scanner motor 152 will now be described. When the scanner motor 152 rotates in a forward direction, the scanner head comprising the first movable member 203 and the second movable member 206 moves in a direction to the right in FIG. 2. When the scanner motor 111 rotates in a reverse direction, the scanner head moves in a direction to the left in FIG. 2. The scanner motor 152 used in this embodiment is preferably a pulse motor, which is rotated at a number of revolutions corresponding to the frequency of a given pulse signal, and which requires a level of driving current corresponding to a required torque.

Initially, when reading of an image is instructed from the main control section (not shown), the controlling CPU 101 determines whether or not the polygon motor 142 is being started according to the rotation signal 121 and the steady-state rotation signal 122. That is, as is also clear from FIGS. 3a–3c, it is determined that when the rotation signal 121 is at an L level and the steady-state rotation signal 122 is at an H level, the polygon motor 142 is being started.

Next, referring to the timing charts of FIGS. 4a–4d, a description is given of the control operation of the scanner motor 152 during a time when the polygon motor 142 is in a steady-state rotation state or in a non-operating state, that is, during a time when the polygon motor 142 is not being started. In FIGS. 4a–4d, it is assumed that, when a rotation signal 131 is at an H level, the scanner motor 152 is not operating, and that, when the rotation signal 131 is at an L level, the scanner motor 152 is being rotated. A forward/backward signal 132 is used to indicate the direction of rotation of the scanner motor 152. When the forward/backward signal 132 is at an H level, the scanner head is moved in a forward direction, and when it is at an L level, the scanner head is moved in a reverse direction. A target number of revolutions signal 133 is used to indicate the number of revolutions of the scanner motor 152. By providing active pulses of a desired frequency, it is possible to cause the scanner motor 152 to be rotated at a number of revolutions that is proportional to the frequency of these pulses. Reference numeral 134 denotes a constant-current-value switch signal, which is used to indicate a constant-current value Is employed when the scanner motor 152 is driven with a constant current. When the constant-current-value switch signal is at an H level, the scanner motor 152 is driven with a constant current represented by value Is=Iα, and, when it is at an L level, the scanner motor 152 is driven with constant current represented by value Is=Iβ(Iβ>Iα).

In an initial state, the rotation signal 131, the forward/backward signal 132, and the constant-current-value switch signal 134, are at an H level, and the target number of revolutions signal 133 is at an L level. Here, when the controlling CPU 101 changes the level of the rotation signal 131 from H to L, and active pulses of a frequency fα are provided as the target number of revolutions signal 133, the scanner motor 152 rotates in a forward direction by a number of revolutions that is proportional to this pulse frequency fα, and the scanner head begins to move forward (t=tα). The driving current Is at this time is set to value Iα. Then, when reading of the entire surface of the original document by the scanner head is completed, the controlling CPU 101 changes the level of the forward/backward signal 132 to L (t=tb), causing the scanner head to move backward. In this case, pulses of a higher frequency fβ are provided as the target number of revolutions signal 133, causing the scanner head to move backward at a high speed. Since a large torque is required for high-speed rotation, the constant-current-value switch signal 134 is changed to level L, and the constant-current value is set to Iβ. Then, when the scanner head returns to its original position, the signal parameters are returned to their initial values (t=tc).

Next, referring to the timing charts of FIGS. 5a–5d, a description is given of the control operation of the scanner motor 152 in a case in which the polygon motor 142 is being started. From an initial state (t<ta) up to a time when the reading of the original document by the scanner head is completed, the various signals are similar to those described above. Then, at a time t=tb, the controlling CPU 101 changes the level of the forward/backward signal 132 to L (t=tb), causing the scanner head to move backward. In this case, however, by providing pulses of a frequency fγ lower than the above-mentioned frequency fβ (fγ<fβ), as the target number of revolutions signal 133, the scanner head is moved backward at a speed lower than that described above. Since a torque larger than that of the above-described case is not required, the constant-current-value switch signal 134 is kept at an H level, and the constant-current value is maintained at a lower value Iα. The value of the driving current Is at this time is denoted as Iγ. When the scanner head returns to its original position, the signal parameters are returned to their initial values, terminating the processing.

More specifically, when the scanner head is moved backward in the normal case, the frequency of the target number of revolutions signal 133 may be originally set at fγβ=4fα so that, when the polygon motor 142 is being started, the frequency is lowered to approximately fγ=2fα. As a result, the backward speed of the scanner head, when the polygon motor 142 is being started, becomes one-half of that in the normal case.

As a result of the above-described control operation, while the polygon motor 142 is being started, a necessary torque is decreased by making the backward speed of the scanner head slower than usual, and the driving current of the scanner motor 152 is lowered, thereby making it possible to employ a power source 161 with a reduced capacity relative to that of power sources used in prior art copying systems.

The foregoing description described a case in which the backward speed of the scanner head is controlled according to whether or not the polygon motor 142 within the image recording section is being started. Similar advantages can also be obtained by controlling the backward speed of the scanner head as described above, according to operating states of loads, other than the polygon motor 142, within the image recording section. An example of a load other than the polygon motor 142 includes a main motor for rotating the photosensitive member 240 in FIG. 1.

Second Embodiment

Figure 8:
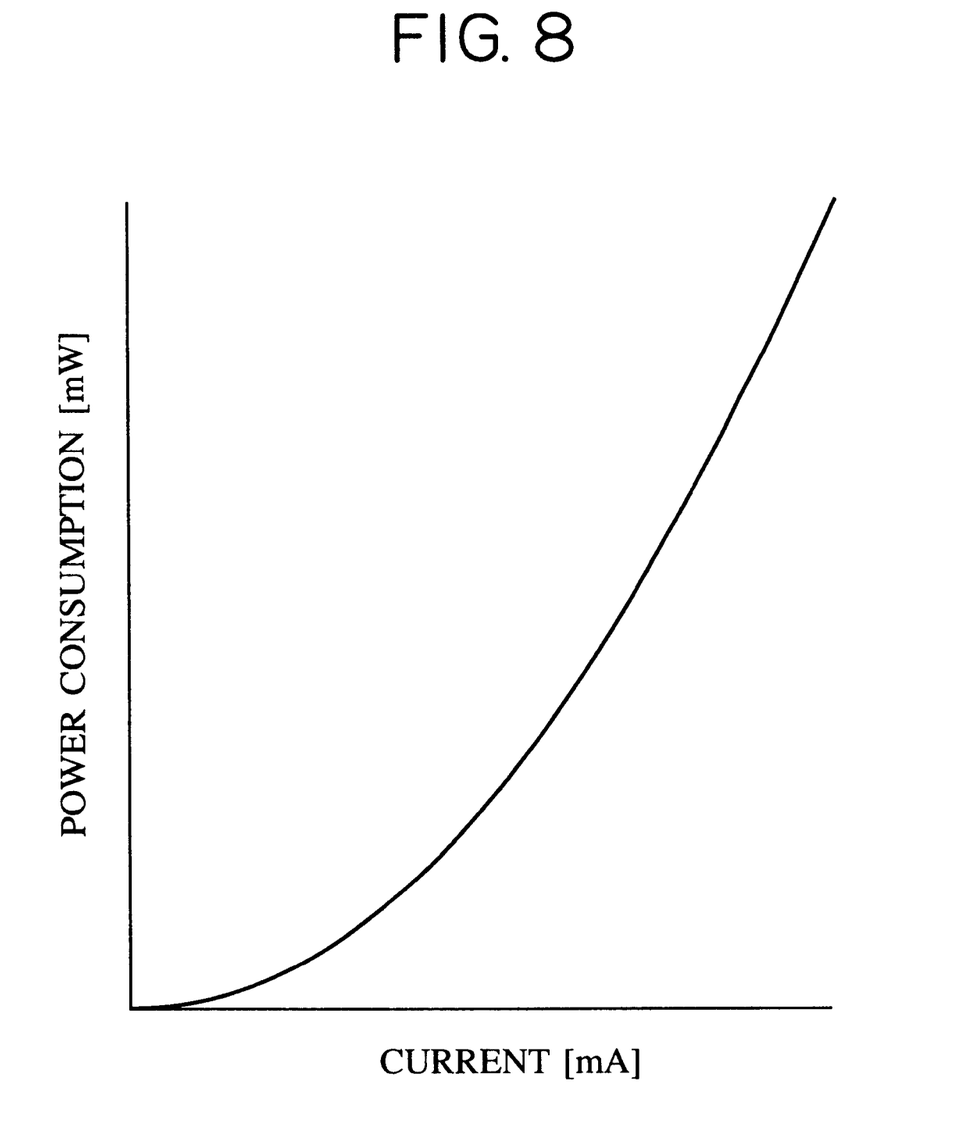
FIG. 8 shows relationships between current consumed by a load and power consumption.

In a second embodiment of the present invention, the return of a portion of the image reading section along the subscanning direction (hereinafter referred to as "backscan") is decelerated only during the period from when the power to the image recording section is switched on until the image recording section becomes operable. This makes it possible to decrease the driving current consumed in the backscan. Since the current—power consumption characteristics of the load are as shown in FIG. 8, as a result of a reduction in the current, the power consumption is reduced. By distributing the amount corresponding to the power consumption to the heat-source supply current of the heat roller 213, electricity is consumed economically.

Figure 6:
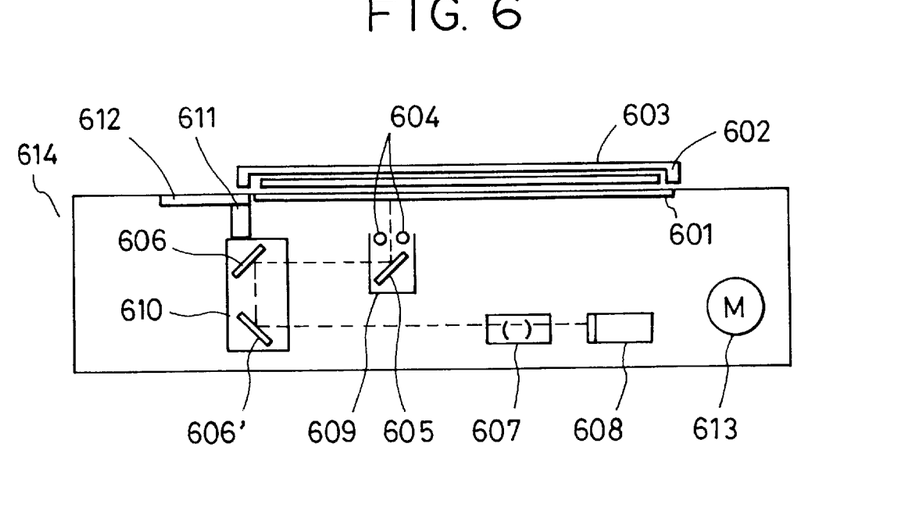
FIG. 6 is a basic diagram of an image reading apparatus according to a second embodiment of the present invention.

FIG. 6 is a diagram of an image reading apparatus (also referred to as "an image reading section") 614 in this copying system (image processing apparatus). The image reading apparatus 614 optically and electrically reads an image of an original document placed on a document holder (platen glass) 601. In addition to a cover 603 of the document holder, this image reading apparatus 614 comprises a document radiation lamp 604, scanning mirrors 605, 606 and 606', an image-forming lens 607, and a CCD image sensor 608. The document radiation lamp 604, which is preferably formed of a halogen lamp, is integrated with the scanning mirrors 605, 606 and 606' and formed into a movable optical unit 610, which scans an original document in the subscanning direction at a preset, fixed speed. A control section 612, formed from keys for setting and displaying various modes regarding a copying sequence, liquid-crystal display devices, and the like, is disposed in the periphery of the document holder 601. Light reflected when the document radiation lamp 604 irradiates the original document is caused to enter the CCD image sensor 608 via the scanning mirrors 605 and 606 and the image-forming lens 607, and various image processing operations are then performed by the image processing apparatus. Reference numeral 611 denotes an image leading-edge sensor. Reference numeral 613 denotes a DC (direct current) servo motor for operating a scanner unit 609 and the optical unit 610 (also referred to collectively as an "image reading head") using a PLL (phase-locked loop).

Figure 7:
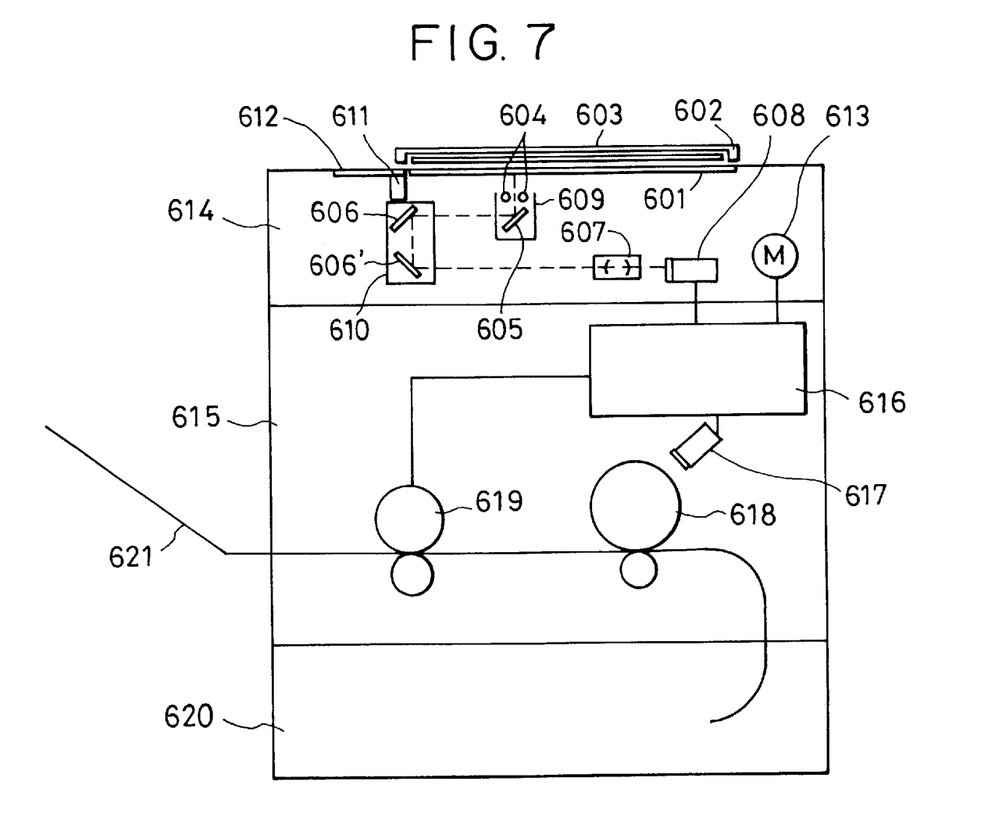
FIG. 7 is a basic diagram of a copying system according to the second embodiment of the present invention.

FIG. 7 is a block diagram of the copying system according to the second embodiment of the present invention. The copying system comprises the image reading apparatus 614, which includes the CCD image sensor 608, DC servo motor 613, and other components, as described above. All of these components are controlled by a controller within an image forming apparatus (also referred to as an "image recording section") 615. The image forming apparatus 615 comprises a laser unit 617 for forming an electrostatic latent image, a drum unit 618 for transferring a toner image from the electrostatic latent image to paper, and a heat roller 619 as a fixing means for fixing the transferred toner image to the paper. The paper is fed from a paper-supply section 620, and is ejected to a paper-ejection tray 621 after undergoing the above-described process.

The power to the image reading apparatus 614 is supplied from the main unit of the copying machine and is linked with the power supplied to the overall copying machine. Furthermore, the controller 616 collects information on the temperature around the heat roller 619, making it possible to control the amount of current provided to the DC servo motor 613, for reading an image, and to the heat roller 619.

Figure 9:
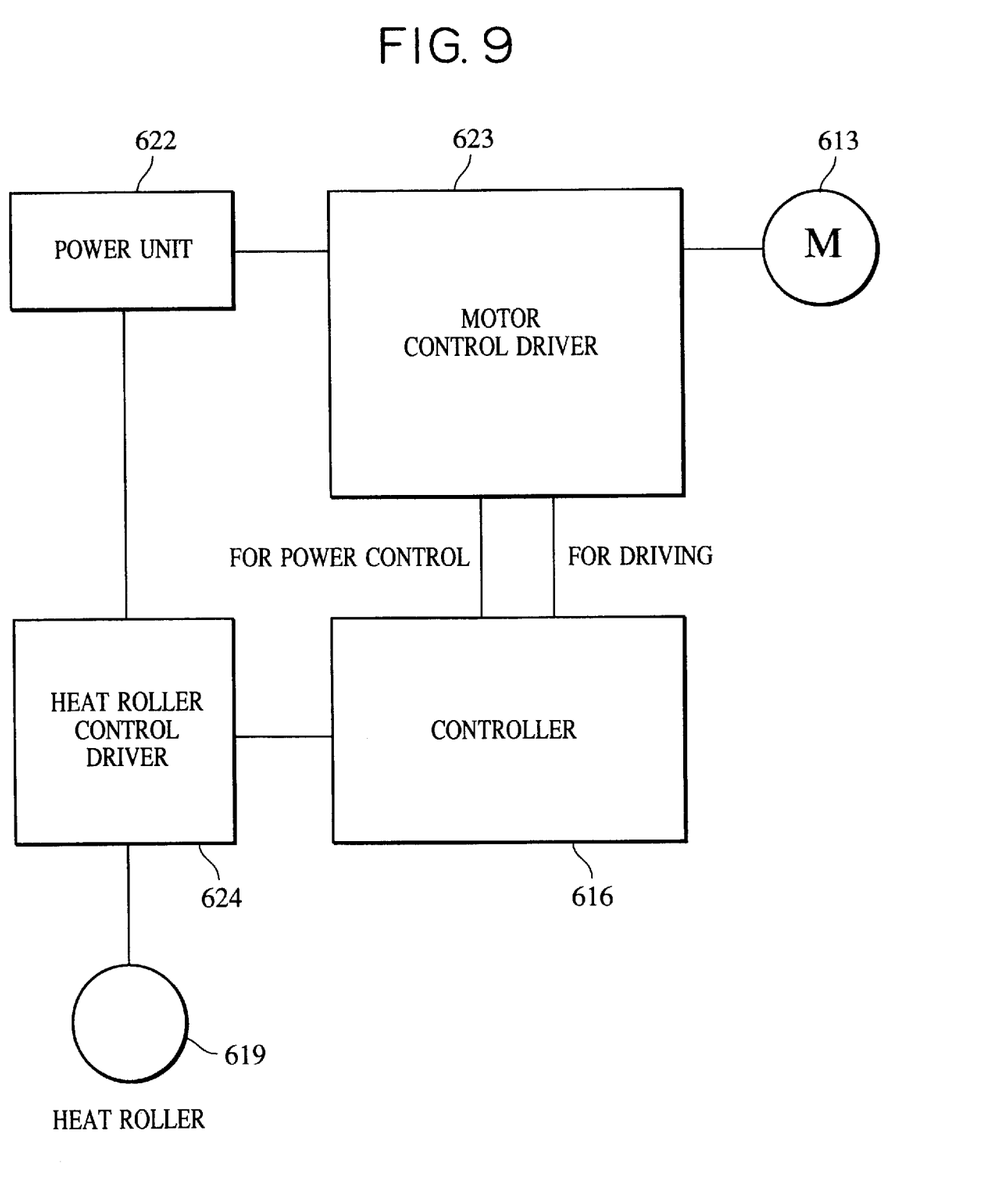
FIG. 9 is a diagram showing features of the second embodiment of the present invention.

FIG. 9 is a block diagram showing the control construction according to the second embodiment of the present invention. A power unit 622 supplies power to the DC servo motor 613 and the heat roller 619 via a motor control driver 623 and a heat roller control driver 624. Furthermore, the motor control driver 623 receives a driving and current control signal from the controller 616, and is able to perform speed control of the DC servo motor 613. The temperature of the heat roller 619 is controlled by the controller 616 via the heat roller control driver 624 in a similar manner.

Figure 10:
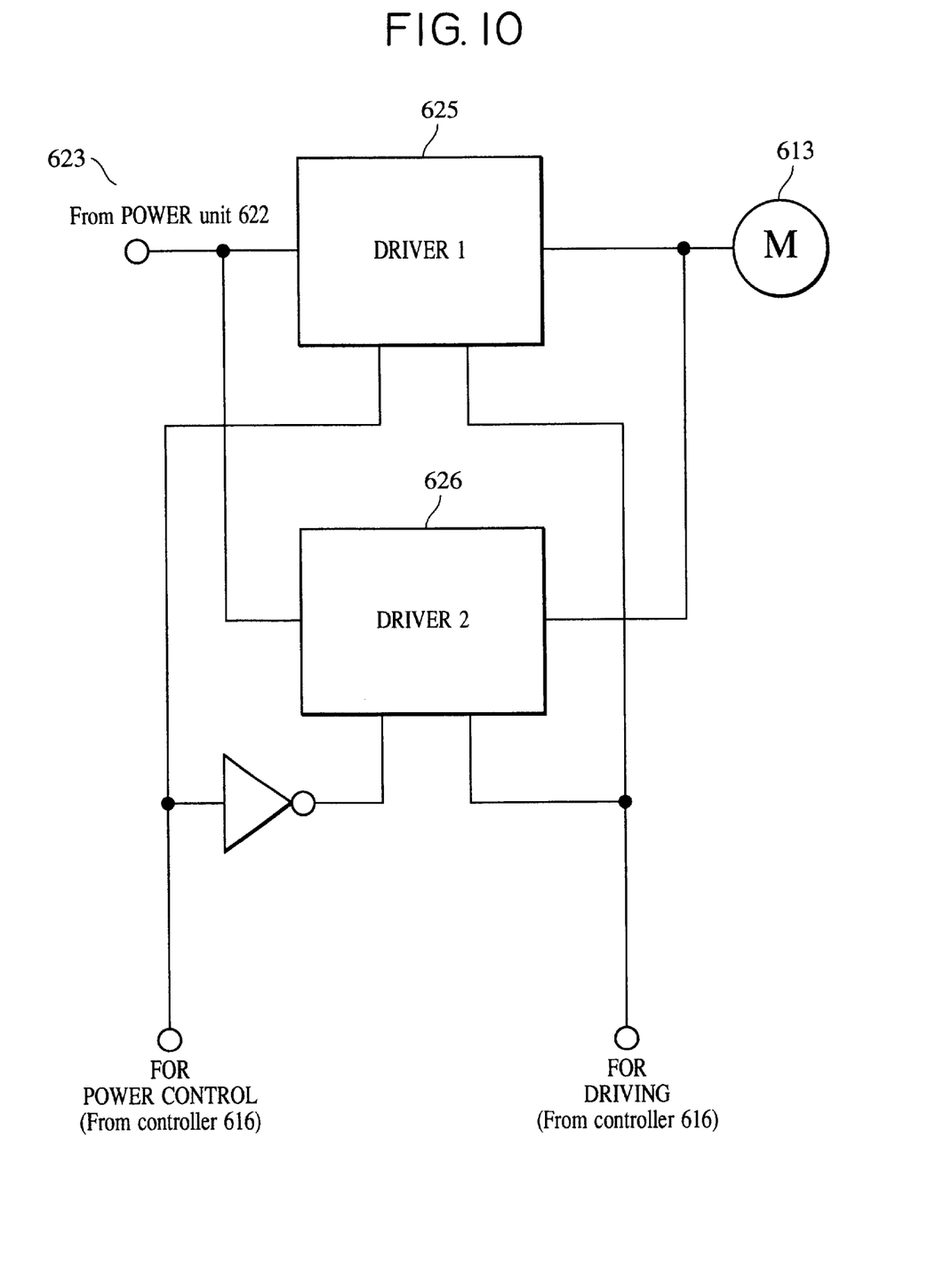
FIG. 10 shows details of a motor control driver 623 of FIG. 9.

A circuit diagram showing the operation of the motor control driver 623 is shown in FIG. 10. Both a driver 1 (625) and a driver 2 (626) obtain an operation permission signal from the driving signal, and the selection of the drivers is made exclusively in accordance with the power control signal. When a power control signal ON is input to the driver 1 (625) in a state in which the driving signal is ON, the DC servo motor 613 is operated at a first backscan speed (normal speed). In the driver 2 (626), in contrast, when the power control signal is turned off, the DC servo motor 613 is operated at a second backscan speed (decelerated speed). This makes it possible to control the backscan speed of the DC servo motor 613 according to the ON/OFF state of the power control signal from the controller 616.

In the above-described control construction, processing is performed in accordance with a control operation, as will now be described, with reference to a control flowchart (see FIG. 11), from a time when the power is switched on. When the power of this copying system comprising both the image reading section and the image recording section is switched on, or the system is being restarted (step S627), initially, paper remaining within the machine of the copying system due to a forced disconnection of the power, during operation, or the like, is detected in step S628. When such remaining paper is detected, processing for the paper remaining within the machine is performed (step S629) to remove the remaining paper.

Figure 11:
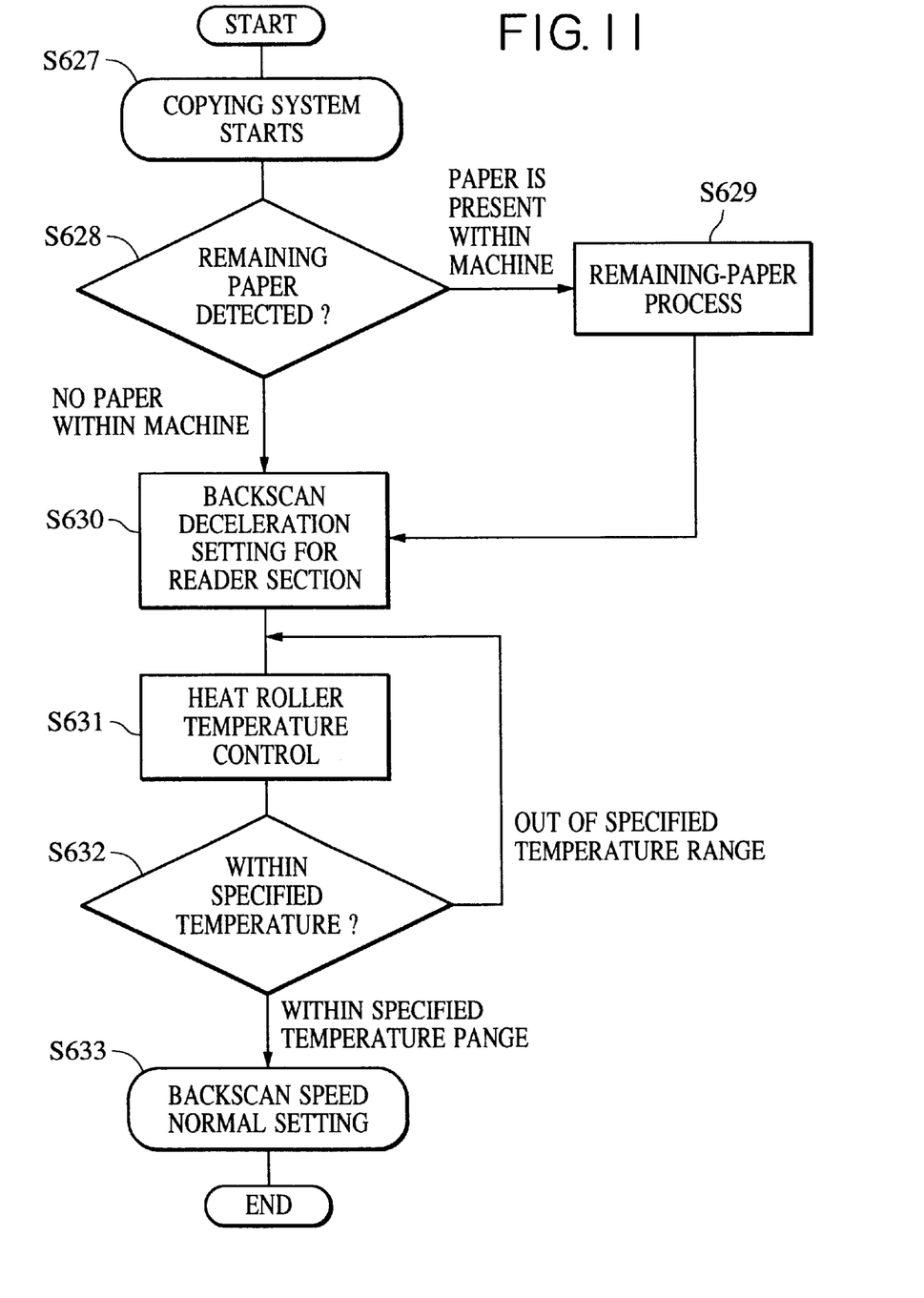
FIG. 11 is a flowchart of processing according to the second embodiment of the present invention.

After the above-described processing operation is terminated, setting is performed in step S630 such that the backscan speed of the DC servo motor 613 of the image reading section is decreased by half, and temperature control is thereafter performed in step S631. Then, heat detection (step S632) of the heat roller 619 is performed, and control (steps S631) of the amount of heat yielded by to the heat roller 619 is repeated, by controlling the amount of current provided to the heat roller 619, until the temperature of the heat roller 619 stabilizes to within a specified temperature range within a reference time period.

When the temperature of the heat roller 619 is stabilized to within the specified temperature range within the specified time period (step S632), the value of electric current provided to the heat roller 619, set previously in the initial operation (step S630), is returned to a steady state operation value, and the backscan speed is returned to the normal speed. As a result, the control of the amount of current provided when the heat roller 619 is heated becomes a normal temperature adjustment operation (step S633).

Figure 12A:
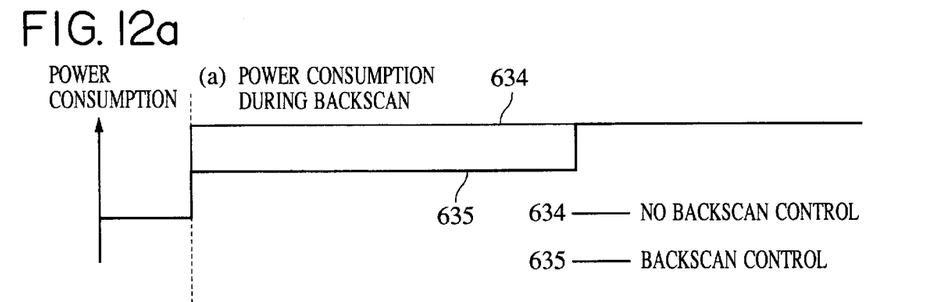
FIGS. 12a–12c show timing charts of power consumption according to the second embodiment of the present invention.
Figure 12B:
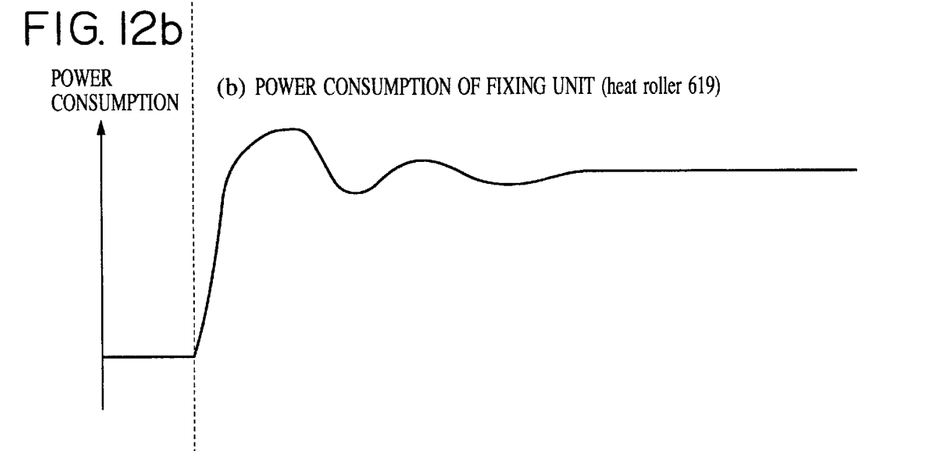
Figure 12C:
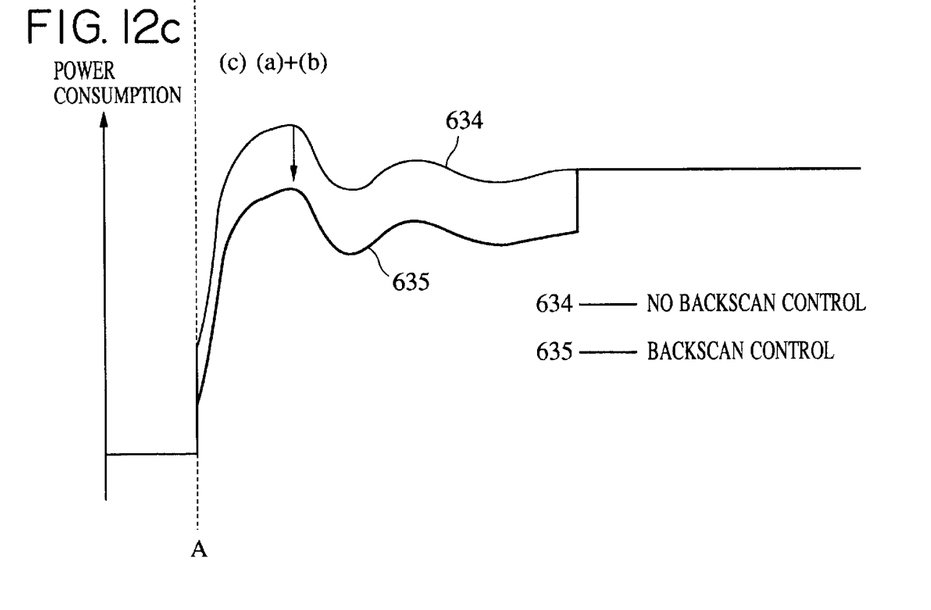

Timing charts showing various power consumptions, and indicating advantages obtained by a control means such as that described above, are shown in FIGS. 12a–12c A case is shown in which a copying operation is started from when the power of the copying system is switched on, or immediately after (point A) the copying system is restarted. In the case of no backscan speed control (634), at the backscan speed at point A, the same amount of power as that during normal operation has already been consumed, and if the amount of power consumption of the heat roller 619 is added, the maximum value of the amount of power consumption is greater than that during steady state operation. In the case of backscan speed control (635), in contrast, the backscan speed control makes it possible to reduce by half the maximum value of the amount of power consumption.

As has been described up to this point, according to the present invention, an image processing apparatus comprising an image reading section and an image recording section includes a means for decreasing the subscanning return speed of a portion of the image reading section, including, for example, a facsimile device, for a limited time period at a time when the power of the image recording section is switched on, and lasting until a time when the temperature adjustment of a heat roller for performing fixing has terminated, and the amount of power consumption at that time is distributed to the temperature adjustment of the heat roller. This makes it possible to reduce the peak value of the power consumption of the entire image processing apparatus. Furthermore, by causing the image reading section to previously operate during a warm-up time period in order to temporarily store image information to be formed in a storage device, it is possible to reduce the waiting time until the start of the overall copying.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An image processing apparatus, comprising:

an image reading section for reading an original document in either a first mode or a second mode, wherein the second mode uses less electric power than the first mode;

an image recording section for recording an image on a recording medium in accordance with an image signal;

a determination unit adapted to determine whether or not said image recording section is in a start-up operation before said image recording section becomes operable to record an image; and a controller for controlling said image reading section in the second mode, based on said determination unit determining said image recording section is in the start-up operation.

2. An image processing apparatus according to claim 1, further comprising a power source for supplying power to said image reading section and said image recording section.

3. An image processing apparatus according to claim 1, wherein during a first period, an image reading head in said reading section moves while reading said original document, and during a second period, said image reading head returns to an original position, and wherein said controller controls the speed of movement of said image reading head during said second period.

4. An image processing apparatus according to claim 3, wherein when it is determined by said determination unit that said image recording section is being started, said controller sets the speed of movement of said image reading head to a speed slower than a normal speed.

5. An image processing apparatus according to claim 1, wherein said image recording section comprises a rotation driving unit and a polygon mirror which scans a light beam, said rotation driving unit drivingly rotating said polygon mirror, and said controller sets the speed of movement of an image reading head in said reading section to a speed slower than a normal speed when said rotation driving unit is being started.

6. An image processing apparatus according to claim 1, wherein said image recording section comprises a fixing unit adapted to fix a toner image on the recording medium, and said controller sets the speed of movement of an image reading head in said reading section to a speed slower than a normal speed when said fixing unit is being started.

7. A method for controlling an image processing apparatus having an image reading section for reading an original document in either a first mode or second mode, wherein the second mode uses less electric power than the first mode, and an image recording section for recording an image on a recording medium in accordance with an image signal, comprising steps of:

determining whether or not said image recording section is in a start-up operation before said image recording section becomes operable to record an image; and controlling said image reading section in the second mode when the determining step determines that the image recording section is in the start-up operation.

8. An image processing method according to claim 7, further comprising supplying power to said image reading section and said image recording section.

9. An image processing method according to claim 7, wherein during a first period, an image reading head in said image reading section moves while reading said original document, and during a second period, said image reading head returns to an original position, and controlling the speed of movement of said image reading head during said second period.

10. An image processing method according to claim 7, wherein when it is determined in said determination step that said image recording section is being started, said controlling step sets the speed of movement of an image reading head in said image reading section to a speed slower than a normal speed.

11. An image processing method according to claim 7, further comprising:

rotating a driving unit adapted to rotate a polygon mirror;

providing a polygon mirror to scan a light beam; and setting the speed of movement of an image reading head in said reading section to a speed slower than a normal speed when said driving unit is being started.

12. An image processing method according to claim 7, further comprising fixing a toner image on the recording medium, and setting the speed of movement of an image reading head in said reading section to a speed slower than a normal speed when said fixing step is being started.

* * * * *

UNITED STATES PATENT AND TRADEMARK OFFICE
CERTIFICATE OF CORRECTION

PATENT NO. : 6,348,982 B2
DATED : February 19, 2002
INVENTOR(S) : Yukimasa Iseki et al.

It is certified that error appears in the above-identified patent and that said Letters Patent is hereby corrected as shown below:

<u>Title page,</u>
Item [*], insert:
-- [*] Notice:   This patent issued on a continued prosecution application filed under 37 CFR 1.53(d), and is subject to the twenty year patent term provisions of 35 U.S.C. 154(a)(2). --; and Item [56], References Cited, under FOREIGN PATENT DOCUMENTS:
"11088601 A" should read -- 11-088601 A --.

<u>Drawings,</u>
Sheet 10 of 11, FIG. 11, "PANGE" should read -- RANGE --.

<u>Column 2,</u>
Line 7, "chars" should read -- charts --.

<u>Column 3,</u>
Line 55, "documents" should read -- document --.

<u>Column 5,</u>
Line 46, "t=tα" should read -- (t=ta) --.

<u>Column 6,</u>
Line 1, "fγlower" should read -- fγ lower --; and
Line 14, "fγβ=4fα" should read -- fβ=4fα --.

<u>Column 8,</u>
Line 10, "(steps S631)" should read -- (step S631) --.

UNITED STATES PATENT AND TRADEMARK OFFICE
CERTIFICATE OF CORRECTION

PATENT NO.    : 6,348,982 B2
DATED         : February 19, 2002
INVENTOR(S)   : Yukimasa Iseki et al.

It is certified that error appears in the above-identified patent and that said Letters Patent is hereby corrected as shown below:

Column 9,
Line 22, "reading section" should read -- image reading section --.

Signed and Sealed this

Seventeenth Day of September, 2002

Attest:

JAMES E. ROGAN
Attesting Officer    Director of the United States Patent and Trademark Office